UNITED STATES PATENT OFFICE 2,163,176

PROCESS FOR MAKING ORGANIC SULPHIDES

Ernst Keyssner, Ludwigshafen-on-the-Rhine, Germany, assignor to I. G. Farbenindustrie Aktiengesellschaft, Frankfort - on - the - Main, Germany No Drawing. Application November 8, 1935, Serial No. 48,872. In Germany November 13, 1934

4 Claims. (Cl. 260—609)

The present invention relates to organic sulphur compounds and a process of producing same.

I have found that valuable organic sulphur compounds are obtained by causing hydrogen sulphide to act in the presence of a basic substance on compounds having the general formula: $R.CH=CH_2$, in which R stands for hydrogen or an alkyl or alkenyl group, i. e. an aliphatic group containing an olefinic bond, a cycloaliphatic, aliphatic-aromatic, aromatic or heterocyclic radicle, an esterified carboxylic group, an ether group or a cyano group. When compounds containing a number of vinyl groups are employed as initial materials, the addition of hydrogen sulphide can be effected a corresponding number of times.

As compounds corresponding to the said formula may be mentioned for example ethylene, propylene, alpha-butylene, alpha-hexylene, octene derived from octyl alcohol, octodecylene derived from octodecyl alcohol, acrylic nitrile, acrylic alkyl esters (acrylic methyl, ethyle and butyl esters), styrene, divinyl benzene, vinyl naphthalene, vinyl pyrrole and vinyl ethers (vinyl methyl ether, vinyl ethyl ether, vinyl butyl ether, vinyl isobutyl ether, vinyl octodecyl ether, vinyl phenyl ether, vinyl benzyl ether, vinyl-ortho-chlorbenzyl ether, vinyl-para-chlorbenzyl ether, vinyl phenyl glycol ether, vinyl naphthyl ether, diglycol monovinyl ether, diglycol divinyl ether, mono- and di-vinyl ethers of di- and tri-ethanol amines and N-methyl-vinyl-hydroxyethyl-meta-toluidine).

The addition of the hydrogen sulphide to the said compounds frequently takes place at ordinary temperature and in other cases at elevated temperature. If necessary the reaction may be favored by employing superatmospheric pressure. It is advantageous to work in the presence of solvents, hydrocarbons and monohydroxylic and polyhydroxylic alcohols for example being suitable for this purpose. When the formation of sulphur compounds of low boiling point is expected, such as is the case for example when employing ethylene, it is preferable to employ a solvent of high boiling point. The process may also be rendered continuous for example by effecting the preparation of dialkyl sulphides by leading the initial materials into the bottom of a tower or similar vessel and withdrawing the alkyl sulphides formed from the top.

As basic substances for the said reaction may be mentioned, for example, the oxides and hydroxides of the alkali and alkaline earth metals and their alcoholates, carbonates, acetates, oxalates, sulphides, sulph-hydrates and mercaptides, and also ammonia and organic bases, such as pyridine or piperidine. If initial substances are employed which split off small amounts of basic substances under the reaction conditions, an addition of such substances is not necessary. Instead of hydrogen sulphide there may also be employed gas mixtures containing hydrogen sulphide or substances which yield hydrogen sulphide under the reaction conditions.

By the process according to this invention, dialkyl sulphides, such as diethyl sulphide, which are known to be good solvents, can be obtained in a much more advantageous manner than hitherto. Furthermore it is possible to obtain a number of compounds which may be employed with advantage for the preparation of dyestuffs, artificial materials or medicines. By oxidizing the products, new sulphoxides and sulphones may be prepared.

The following examples will further illustrate how the said invention may be carried out in practice but the invention is not restricted to these examples. The parts are by weight.

Example 1

A mixture of 28 parts of ethylene and 17 parts of hydrogen sulphide is heated for from eight to ten hours at 100° C. in a pressure-tight vessel which is charged with a solution of 0.5 part of sodium in 150 parts of ethanol. The course of the reaction may be observed by the decrease in the pressure. The diethyl sulphide thus formed in a good yield may be obtained in a pure state by fractional distillation, if desired preceded by a treatment with water for the removal of ethanol and sodium ethylate.

Di-isopropyl sulphide may be obtained in the same manner from propylene.

Example 2

A mixture of 53 parts of acrylic nitrile, 17 parts of hydrogen sulphide and 60 parts of butanol is heated for ten hours at 80° C. in a pressure-tight vessel. By distillation there is obtained a good yield of mainly the nitrile of thiodihydroacrylic acid $$(NC.CH_2.CH_2.S.CH_2.CH_2.CN)$$

which boils between 179° and 180° C. at 3 millimetres (mercury gauge).

By saponification the free acid is obtained which can be converted into its sulphone by oxidation.

Example 3

A mixture of 104 parts of styrene, 17 parts of hydrogen sulphide, 100 parts of ethanol and 1 part of ammonia is heated at 100° C. for about ten hours in a pressure-tight vessel. The liquid thus obtained forms two layers of which the lower contains the greater part of the addition compound formed. By distillation, diphenyldiethyl sulphide is obtained which boils at 143° C. at 1 millimetre (mercury gauge). The sulphone obtainable therefrom by oxidation melts at 137° C.

*Example 4*

136 parts of vinyl anisol and 20 parts of hydrogen sulphide are heated for fifteen hours at 100° C. in a pressure-tight vessel which is charged with a solution of 2 parts of sodium in 150 parts of ethanol. Two layers are thus formed from the lower of which a very good yield of bis(4-methoxy-phenyl)-diethyl sulphide which boils at between 160° and 162° C. at 0.3 millimetre (mercury gauge) is obtained after working up.

*Example 5*

130 parts of para-divinylbenzene and 50 parts of hydrogen sulphide are heated at 100° C. for ten hours in a pressure-tight vessel containing a solution of 5 parts of sodium in 500 parts of ethanol. The addition compound which is almost insoluble in ethanol is obtained in the form of a colorless viscous mass which can be purified by redissolving it in benzene. The final reaction product is not of uniform composition. It probably consists of a mixture of compounds of the type represented by the following formulae:

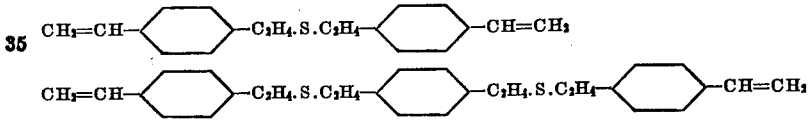

*Example 6*

Hydrogen sulphide is led under atmospheric pressure into a mixture of 25 parts of styrene and a solution of 1 part of sodium in 100 parts of butanol at from 110° to 120° C. After two days, the diphenyl diethyl sulphide which has been formed in a good yield is separated by fractional distillation.

*Example 7*

A mixture of 25 parts of styrene, 50 parts of ethanol, 0.5 part of ammonia and 25 parts of hydrogen sulphide is charged into a pressure-tight vessel and allowed to stand for six days at room temperature. The pressure amounts to about 10 atmospheres. The excess of hydrogen sulphide is then allowed to escape, the contents of the vessel are treated with water and the diphenyl-ethyl sulphide formed is distilled off.

What I claim is:

1. A process of producing organic sulphur compounds which comprises causing hydrogen sulphide to act in the presence of a strong base on compounds having the general formula R—CH=CH$_2$, in which R stands for a residue selected from the group consisting of hydrogen and the alkyl, alkenyl, cyclo-aliphatic, aliphatic-aromatic, aromatic and heterocyclic radicals.

2. A process of producing organic sulphur compounds which comprises causing hydrogen sulphide to act in the presence of a strong base on compounds having the general formula R—CH=CH$_2$, in which R stands for a residue selected from the group consisting of hydrogen and the alkyl, alkenyl, cyclo-aliphatic, aliphatic-aromatic, aromatic and heterocyclic radicals under superatmospheric pressure.

3. A process of producing organic sulphur compounds which comprises heating compounds having the general formula R—CH=CH$_2$, in which R stands for a residue selected from the group consisting of hydrogen and the alkyl, alkenyl, cyclo-aliphatic, aliphatic-aromatic, aromatic and heterocyclic radicals with hydrogen sulphide in the presence of a strong base.

4. A process of producing organic sulphur compounds which comprises heating under superatmospheric pressure compounds having the general formula R—CH=CH$_2$, in which R stands for a residue selected from the group consisting of hydrogen and the alkyl, alkenyl, cyclo-aliphatic, aliphatic-aromatic, aromatic and heterocyclic radicals with hydrogen sulphide in the presence of a strong base.

ERNST KEYSSNER.